United States Patent [19]

Tsutsumi

[11] Patent Number: 4,520,261
[45] Date of Patent: May 28, 1985

[54] DETECTOR FOR THE DEVIATION OF THE OPTICAL AXIS IN LASER PROCESSING APPARATUS

[75] Inventor: Akira Tsutsumi, La Mirada, Calif.

[73] Assignee: Amada Company, Limited, Japan

[21] Appl. No.: 597,568

[22] Filed: Apr. 9, 1984

Related U.S. Application Data

[63] Continuation of Ser. No. 299,189, Sep. 2, 1981, abandoned.

[30] Foreign Application Priority Data

Sep. 2, 1980 [JP] Japan .......................... 55-124058[U]

[51] Int. Cl.³ ............................. G01J 1/20; B23K 9/00
[52] U.S. Cl. ............................... 250/203 R; 356/400; 219/121 LU; 219/121 LY; 219/121 LA
[58] Field of Search ................... 250/203 R, 201, 557, 250/548; 356/152, 399, 400; 33/DIG. 21, 293; 219/121 LA, 121 LB, 121 LY, 121 LU, 121 LX, 121 LZ, 121 LM, 121 LJ, 121 L

[56] References Cited

U.S. PATENT DOCUMENTS

| | | | |
|---|---|---|---|
| 3,551,057 | 12/1970 | Hamilton et al. | 250/203 R |
| 3,603,691 | 9/1971 | Hamilton | 356/400 |
| 3,782,823 | 1/1974 | Kantorski et al. | 219/121 LB |
| 3,805,015 | 4/1974 | Herziger et al. | 219/121 LA |
| 4,012,148 | 3/1977 | Marantette et al. | 356/400 |
| 4,193,689 | 3/1980 | Reymond et al. | 356/152 |
| 4,315,690 | 2/1982 | Trocellier et al. | 250/203 R |
| 4,335,296 | 6/1982 | Bredlow | 219/121 LY |

FOREIGN PATENT DOCUMENTS

54-157650 12/1979 Japan ................... 356/400

*Primary Examiner*—David C. Nelms
*Assistant Examiner*—Jere J. Brophy
*Attorney, Agent, or Firm*—Wigman & Cohen

[57] ABSTRACT

This invention relates to a device for detecting the amount of deviation of the optical axis of laser beams from a predetermined point at which a workpiece is to be processed in a laser processing apparatus.

The detector includes a laser resonator, a device for transferring the workpiece in the direction of both the X- and Y-axes, a base plate detachably mounted onto the workpiece transferring device, a plurality of image sensors disposed radially around the predetermined point located on the upper surface of the base plate, and a device for displaying the optical axis of the laser beams irradiated from the laser resonator to at least three of the plurality of image sensors, whereby the workpiece may be transferred so that the optical axis of the laser beams coincides with the predetermined point at which the workpiece is to be processed.

In the detector, each of the plurality of image sensors includes a photoreceiving section in which a plurality of photoreceiving elements, made of semiconductor material, are arranged linearly.

The device may also include a lens, adjustably mounted in the path of the optical axis, for converging the laser beams and a plurality of reflectors for deflecting the laser beams from the laser resonator to the upper surface of the baseplate.

9 Claims, 5 Drawing Figures

DETECTOR FOR THE DEVIATION OF THE OPTICAL AXIS IN LASER PROCESSING APPARATUS

This application is a continuation, of application Ser. No. 299,189, filed Sept. 2, 1981 now abandoned.

BACKGROUND OF THE INVENTION

1. Field of the Invention

This invention concerns a laser processing apparatus for cutting plate-like workpieces by laser beams and, in particular, it relates to an improvement in the processing accuracy by the accurate detection of the position of the optical axis.

2. Description of the Prior Art

In a laser processing apparatus, processing is generally carried out under the control of a numerical control device or a computer. In such laser processing apparatus, it is required to exactly set the positional relation between an original position or reference position for initially positioning a plate-like material to be processed and a processing position where the optical axis of laser beams is to be located. The original position is indicated with reference to the optical axis of the laser beams. Accordingly, upon setting a positional input to a control device, such as a numerical control device, the optical axis of the laser beams is positioned from the original position to the position for which the input is set. Then, the subsequent positioning for the workpieces is effected based on the original position as the reference in accordance with the signals for the coordinate values inputted to the control device. When laser processing, such as weld-cutting, is carried out after the positioning of the workpiece, there are no problems if the positional relation between the original position and the optical axis of the laser beams is always maintained exactly. In the laser processing apparatus, however, slight deviation may sometimes be caused to the axial center position of the laser beams due to the exchange of a condenser lens and the like or due to an error in the optical path system during use. This has an undesired effect on the fabrication accuracy. Since a carbon dioxide gas laser in the form of invisible rays is generally used, it has been rather difficult to detect the deviation of the optical axis of the laser beams.

SUMMARY OF THE INVENTION

This invention has been made in view of the foregoing problems and a primary object thereof is to provide a detector capable of detecting with much ease the deviation amount of the optical axis of the laser beams in a laser processing apparatus employing a usual commercially available $CO_2$ laser resonator.

The secondary object of this invention is to provide a laser processing apparatus capable of detecting the deviation amount for the optical axis of the laser beams and carrying out the laser machining at high accuracy by the correction of the deviation amount.

Other and further objects and advantages of the present invention will be made more clear by the explanations for a preferred embodiment referring to the accompanying drawing.

In order to attain the foregoing objects, according to this invention, a plurality of image sensors are disposed radially around a certain point at their center. The optical axis of the laser beam irradiated from a laser machining apparatus to each of the image sensors is calculated and displayed based on at least three points of positions of the image sensors irradiated by the laser beams.

DESCRIPTION OF THE PREFERRED EMBODIMENTS

Figure 1:
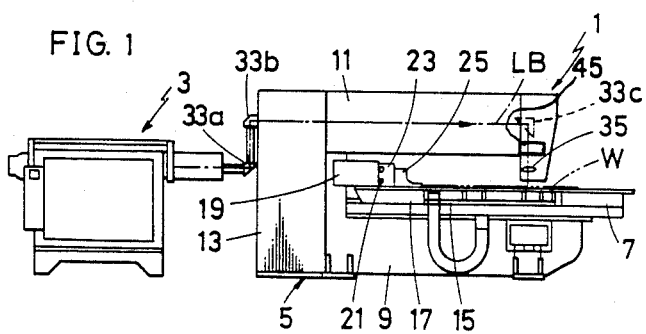
FIG. 1 is a side elevational view and FIG. 2 is a top plan view, respectively, of a laser processor embodying the principles of the present invention.
Figure 2:
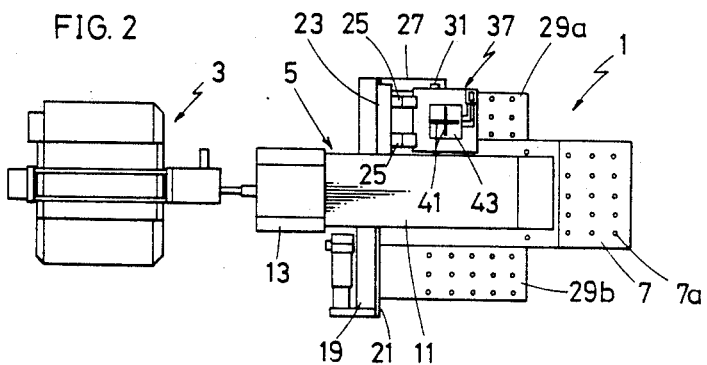

Referring to FIGS. 1 and 2, the laser processing apparatus 1 comprises a laser resonator 3, such as a $CO_2$ (carbon dioxide gas) laser resonator, and a processing unit 5 of a C-shaped frame. Since the laser resonator 3 may be a usual commercially available one, no particular description will be necessary for the detailed structure thereof.

The processing unit 5 comprises a base 9 for the support of a table 7 that movably supports on its upper surface a plate-like workpiece W, an overhead beam 11 located above the base 9 and a vertical column 13 joining the base 9 and the overhead beam 11 in a configuration of a letter C.

A plurality of friction reducing means 7a equipped with rotatable steel balls are mounted on the upper surface of the table 7 for smoothly supporting the workpiece W. On both sides of the base 9 (on both front and rear sides in the drawing of FIGS. 1 and 2), there are attached a pair of Y-axis guide bars 15 horizontally extending therealong (left- and right-wardly in FIG. 1) and a pair of Y-axis carriages 17 movable in the left- and right-ward directions along the Y-axis guide bars 15. Both Y-axis carriages 17 are integrally connected with each other by a connection member 19 that extends in the direction of the X-axis (in the horizontal direction perpendicular to the Y-axis with a slight gap being kept relative to the upper surface of the table 7. Accordingly, both of the Y-axis carriages 17 are integrally moved right- and left-wardly in FIG. 1.

The connection member 19 is mounted with an X-axis guide bar 21 extending in the direction of axis X perpendicular to the Y-axis guide bars 15. The X-axis guide bar 21 is provided with an X-axis carriage 23 movable along the X-axis guide bar 21. A plurality of work clamps 25, which are capable of clamping the end portion of the workpiece W movably supported on the surface of the table 7, are mounted by an appropriate number to the X-axis carriage 23. Accordingly, by moving the X-axis carriage 23 appropriately along the X-axis guide bar 21, the workpiece W is moved in the direction of the X-axis while clamped in the work clamp 25. In this way, the workpiece W can suitably be moved and positioned both in the directions of the X and Y axes by moving the Y-axis carriage 17 in the direction of the Y-axis and the X-axis carriage 23 in the direction of the X-axis.

An arm 27 extending in parallel with the Y-axis guide bars 15 is mounted at one end of the connection member 19 (upper end in FIG. 2 of this embodiment), and a pair of movable tables 29a and 29b are integrally attached on both sides of the table 7. The upper surfaces of the arm 27, the table 7 and the movable tables 29a and 29b are coplanar or flush with each other. A reference stopper 31 in the direction of the X-axis is mounted near the top end of the arm 27 so as to be vertically projectable and retractable relative to the upper surfaces. Consequently, when the workpiece W is abutted at its edge against the reference stopper 31 kept in a projected state, the workpiece W is positioned at the reference position, namely, the original position, in the direction of the X-axis. Also, the workpiece W is positioned relative to the reference position in the direction of the Y-axis, when held in contact with a stopper (not shown) provided next to the work clamp 25 with the Y-axis carriage 17 positioned in the most leftward position in FIGS. 1 and 2.

As can be seen from the foregoing descriptions, the original position (position for X=0, Y=0) is at the crossing point of a linear line in the direction of the Y-axis passing through the abutting surface of the reference stopper 31 and the linear line in the direction of the X-axis passing through the abutting surface of the stopper of the work clamp 25 when the Y-axis carriages 17 are located most leftwardly in FIG. 1 and FIG. 2. Accordingly, the corner of the workpiece W is positioned at the original position (X=0, Y=0) when the two crossing edges of the workpiece W are positioned in contact with the stopper of the work clamp 25 and the reference stopper 31, respectively, the Y-axis carriages 17 located most leftwardly in FIG. 1 and FIG. 2. In this state, the workpiece W can be positioned exactly in the directions of axes X and Y by clamping the workpiece W by the work clamp 25 and moving it in the directions of the axes X and Y with the original position as the reference.

In this connection, it will be understood that the Y-axis carriages 17 and the X-axis carriage 23 can be automatically moved and stopped along the Y and X axes under the control of a suitable control device such as a numerical control device or a computer (not shown) to position the workpiece W in the X and Y axes.

A plurality of beam benders (reflection mirrors) 33a, 33b and 33c are mounted on the overhead beam 11 to suitably deflect laser beams LB coming from the laser resonator 3, so that the laser beams LB are vertically deflected to the upper surface of the table 7 by the beam bender 33c mounted near the forward end of the overhead beam 11. Also, a condenser lens 35 is vertically and adjustably mounted to the forward end of the overhead beam 11 to condense the laser beams LB into a fine spot diameter at the upper surface of the workpiece W when vertically adjusted. Although not shown in the drawings, a nozzle for jetting out assist gas to the position of the laser processing of the workpiece W is provided at the lower portion of the forward end of the overhead beam 11 and a dust collector is provided therebelow on the base 9 for drawing slugs or gases resulting from the laser processing. From the above description, it will be understood that the workpiece W can be laser machined into a desired configuration by projecting the laser beams LB from the laser resonator 3 to the workpiece W on the table 7, jetting out the assist gas from the nozzle and properly moving the workpiece W in the directions of the X and Y axes.

In the above-described arrangement, however, the processing accuracy will be damaged, if an error or deviation is produced in the positional relation between the processing position, namely, the optical axis of the laser beams LB, and the original position (X=0, Y=0) upon carrying out laser processing while moving and positioning the workpiece W in the directions of the axes X and Y. Therefore, in order to overcome this disadvantage, a deviation detecting means 37 for detecting the deviation amount of the optical axis of the laser beams LB is provided according to the present invention.

Figure 3:
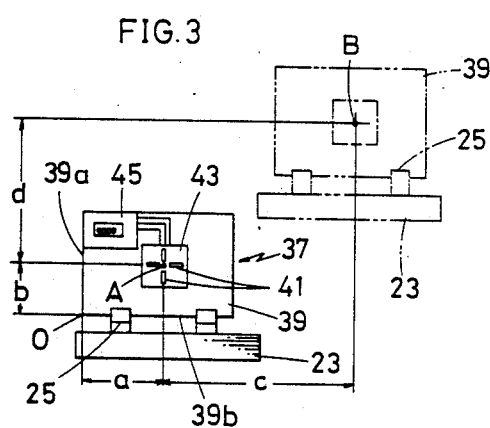
FIG. 3 is a detailed top plan view for the deviation detector.

As shown in FIGS. 2 and 3, the deviation detecting means 37 comprises a position sensor 43 having a plurality of image sensors 41 mounted on a reference plate 39 having side edges 39a and 39b perpendicular to each other. Each of the image sensors 41 comprises a photoreceiving section in which a plurality of small photoreceiving elements made of semiconductor material are arranged linearly and an electronic scanning section made of a shift register adapted to apply the electronic scanning on the photoreceiving section to thereby detect output signals (photo-current) in accordance with the number of photoreceiving elements that receive light in the photoreceiving section. Thus, the photoimpinged range in the photoreceiving section can be determined by the detection of the output signals.

Figure 4:
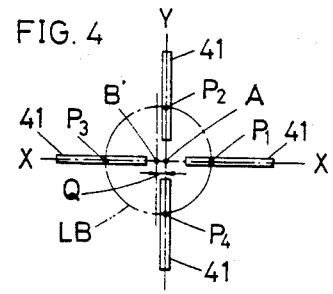
FIGS. 4 and 5 are detailed views for the detection of the deviation amount.
Figure 5:
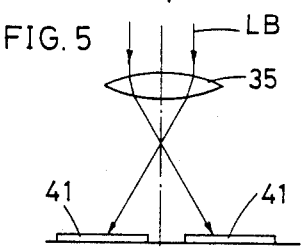

As shown specifically in FIG. 4, the image sensors 41 are disposed radially (in the directions of the X and Y axes in this embodiment) around a point A as the center, and the distance from the point A to the inner end of each of image sensors 41 is set equally. The point A is located at the coordinate position of the X- and Y-axes where the crossing point of the side edges 39a and 39b of the reference plate 39 coincides with the original point zero. Accordingly, the point A will coincide with the optical axis of the laser beams LB which is situated at a predetermined point B ($X=a+c$, $Y=b+d$) by the movement for the distance c in the direction of the X-axis and for the distance d in the direction of the Y-axis. Thus, when the point A is moved and positioned at the point B, if laser beams LB are irradiated on the image sensors 41 as shown in FIG. 4 and FIG. 5, each of the image sensors 41 will receive and sense the laser beams LB upon projection of the laser beams LB on the image sensor 41. It is desired to decrease the energy of the laser beams LB by a suitable means such as a half mirror upon irradiation of the laser beams LB to the image sensor 41. If the point A and the point B coincide with each other, the distances from the point A to the boundary points p1, p2, p3, p4 between the portions receiving laser rays and the portions not receiving laser rays in each of the image sensors 41 will be equal to each other. However, if the optical axis of the laser beams LB should be deviated, a difference results in the distances between the point A and the boundary points p1, p2, p3, p4. Accordingly, the deviation amount Q for the optical axis of the laser beams LB relative to the point A can be determined by detecting the positions for appropriate three points, for example, the boundary points p1, p2, p3 and by calculating to determine the cross point B' between a bisector perpendicular to segment $\overline{p1\ p2}$ and a bisector perpendicular to segment $\overline{p2\ p3}$. Thus, by applying correction to the deviation amount Q, laser processing can be carried out at high accuracy even in a case where deviation should be produced in the optical axis of the laser beam LB.

The movement of the reference plate 39 to the point B in the manner as stated before is carried out by positioning the Y-axis carriages 17 most leftwardly in FIG. 1 and FIG. 2, and positioning the reference plate 39 in the direction of the X and Y axes in the same manner as in the workpiece W, thereafter, moving the reference plate 39 in the direction of the X and Y axes while clamped by the work clamp 25 in the same manner as in the workpiece W.

A display device 45 is mounted upon the deviation detector 37. The display device 45 is electrically connected to each of the image sensors 41 and adapted to perform a calculating operation for determining the position of the point B' based on the input signals from each of the image sensors 41 in accordance with each of the boundary points p1, p2, p3, p4. The display device 45 then calculates for display the deviation amount Q. Accordingly, the deviation amount Q for the axial center of the laser beams LB can be determined by the reading of the indication on the display device 45, whereby the deviation amount can be corrected with ease.

As can be understood from the above described embodiment according to the invention, since the deflection amount for the axial center of the laser beams LB can be detected with ease, the processing accuracy in the laser processing apparatus can be improved by the correction for the deviation amount. Thus, even if the optical axis of the laser beam should be deviated due to the exchange of the condenser lens or errors in the optical path system in the laser beams, laser processing can be conducted at high accuracy with no troubles.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A laser processing device for cutting a workpiece with a laser beam and detecting the amount of deviation of the optical axis of the laser beam from a predetermined point at which the workpiece is to be processed in said laser processing device, comprising:
   (a) means for producing a laser beam capable of cutting a workpiece;
   (b) an X-axis carriage and a Y-axis carriage, and X-axis carriage movable in the direction of the X-axis along the Y-axis carriage which is movable in the direction of the Y-axis.
   (c) a work clamp provided on said X-axis carriage, said work clamp adapted to hold one of a workpiece and a deviation detecting means, said detecting means comprising a plurality of image sensing means disposed radially around the predetermined point located on an upper surface of a base plate for generating signals, and means for displaying said signals from the sensing means for indicating the optical axis of the laser beam irradiated from the laser beam producing means to at least three of the plurality of image sensors;
   whereby the workpiece may be exchanged for the deviation detecting means and said carriages may be adjusted so that the optical axis of the laser beam coincides with the predetermined point at which the workpiece is to be processed.

2. The device as defined in claim 1, wherein each of the plurality of image sensors includes a photoreceiving section in which a plurality of photoreceiving elements, made of semiconductor material, are arranged linearly.

3. The device according to claim 1, further comprising:
   (f) lens means, adjustably mounted in the path of the optical axis, for converging the laser beam; and
   (g) a plurality of reflector means for deflecting the laser beam from the laser beam producing means to the upper surface of the base plate.

4. A laser processing device for cutting a workpiece and a laser beam and for detecting the amount of deviation of the optical axis of the laser beam from a predetermined point at which a workpiece is to be processed in said laser processing device, comprising:
   (a) means for producing a laser beam capable of cutting a workpiece;
   (b) a carriage movable in the plane transverse to the optical axis of the laser beam;
   (c) a work clamp provided on said carriage, said work clamp adapted to hold one of a workpiece and a deviation detecting means, said detecting means comprising a plurality of image sensing means disposed radially around the predetermined point located on an upper surface of a base plate for generating signals, and means for displaying said signals from the sensing means for indicating the optical axis of the laser beam irradiated from the laser beam producing means to at least three of the plurality of image sensors; and
   (d) a means to decrease the energy of the laser beam when said deviation detecting means is being used to determine the location of the optical axis;
   whereby the workpiece may be exchanged for the deviation detecting means and said carriage may be adjusted so that the optical axis of the laser beam coincides with the predetermined point at which the workpiece is to be processed.

5. The device as defined in claim 4, wherein each of the plurality of image sensors includes a photo receiving section in which a plurality of photo receiving elements, made of semiconductor material, are arranged linearally.

6. The device according to claim 4, further comprising:
   (e) lens means, adjustably mounted in the path of the optical access, for converging the laser beam; and
   (f) a plurality of reflector means for deflecting the laser beam from the laser beam producing means to the upper surface of the base plate.

7. The laser processing device of claim 4, wherein said means to decrease the energy of the laser beam comprises a half mirror.

8. The laser processing device of claim 4, wherein said carriage comprises an X-axis carriage and a Y-axis carriage, said X-axis carriage movable in the direction of the X-axis along the Y-axis carriage which is movable in the direction of the Y-axis.

9. A method of laser processing comprising the steps of:
   providing a carriage movable in transverse axes;
   detachably providing a deviation detection means on said carriage;
   directing a laser beam toward the carriage;
   adjusting the carriage in relation to the laser beam in response to a signal produced by the deviation detection means;
   replacing the deviation detection means with a workpiece; and
   processing said workpiece with the laser beam.

* * * * *